US012681882B2

(12) United States Patent
Belghoul et al.

(10) Patent No.: US 12,681,882 B2
(45) Date of Patent: Jul. 14, 2026

(54) BUS PROTOCOL FOR MULTIPLE CHIPSETS

(71) Applicant: Apple Inc., Cupertino, CA (US)

(72) Inventors: Farouk Belghoul, Campbell, CA (US);
Paul V. Flynn, Menlo Park, CA (US);
Tideya Kella, San Jose, CA (US);
Vijay Kumar Ramamurthi, Fremont,
CA (US)

( * ) Notice: Subject to any disclaimer, the term of this
patent is extended or adjusted under 35
U.S.C. 154(b) by 49 days.

(21) Appl. No.: 18/464,981

(22) Filed: Sep. 11, 2023

(65) Prior Publication Data

US 2023/0418776 A1     Dec. 28, 2023

Related U.S. Application Data

(63) Continuation of application No. 17/357,156, filed on
Jun. 24, 2021, now Pat. No. 11,822,501, which is a
continuation of application No. 16/584,686, filed on
Sep. 26, 2019, now Pat. No. 11,074,210.

(60) Provisional application No. 62/777,145, filed on Dec.
8, 2018.

(51) Int. Cl.
*G06F 13/40*          (2006.01)
*H04L 12/40*          (2006.01)
*H04L 69/323*         (2022.01)
*H04W 4/80*           (2018.01)
*H04W 84/12*          (2009.01)

(52) U.S. Cl.
CPC .......... *G06F 13/4027* (2013.01); *H04L 12/40*
(2013.01); *H04L 69/323* (2013.01); *H04W*
*4/80* (2018.02); *H04W 84/12* (2013.01)

(58) Field of Classification Search
CPC ... G06F 13/4027; H04L 12/40; H04L 69/323;
H04W 4/80; H04W 84/12
See application file for complete search history.

(56) References Cited

U.S. PATENT DOCUMENTS

| | | | |
|---|---|---|---|
| 6,378,077 B1 | 4/2002 | Atkinson | |
| 6,473,569 B1 | 10/2002 | Shidate et al. | |
| 6,731,146 B1 | 5/2004 | Gallardo | |
| 7,765,334 B2 | 7/2010 | Shiba et al. | |
| 8,238,233 B2 | 8/2012 | Weast | |
| 9,913,216 B1 | 3/2018 | Deshpande | |
| 10,117,288 B1 * | 10/2018 | Desai | H04W 76/16 |
| 10,929,330 B2 * | 2/2021 | Chen | G06F 13/4004 |

(Continued)

OTHER PUBLICATIONS

Kumar. Sanjeev, et al., "MIPI-SPMI Multi-Master Verification
Architecture," presentation at the 2017 MIPI Alliance Developers
Conference, Bangalore, India, 14 pages. <URL: https://www.mipi.
org/sites/default/files/Bangalore-Qualcomm-SPMI-1.0-Multi-master-
Verification.pdf>.

(Continued)

*Primary Examiner* — Henry Tsai
*Assistant Examiner* — Aurangzeb Hassan
(74) *Attorney, Agent, or Firm* — Treyz Law Group, P.C.;
Tianyi He

(57)          ABSTRACT

Circuits, methods, and apparatus that can allow chipsets in
an electronic device to share information such that they can
more efficiently utilize resources that are available in the
electronic device. One example can provide a bus that is
shared by three or more chipsets in an electronic device. This
shared bus can be used by the chipsets in the electronic
device to communicate and negotiate for the utilization of
resources of the electronic device.

20 Claims, 6 Drawing Sheets

(56) References Cited

U.S. PATENT DOCUMENTS

| | | | |
|---|---|---|---|
| 11,379,399 B2* | 7/2022 | Taye ..................... | G06F 13/385 |
| 12,255,694 B1* | 3/2025 | Kleinbeck .............. | H04B 17/27 |
| 2007/0239921 A1 | 10/2007 | Toorians et al. | |
| 2008/0001734 A1 | 1/2008 | Stilp et al. | |
| 2008/0147924 A1* | 6/2008 | Lambert ............. | G06F 13/4072 |
| | | | 710/62 |
| 2009/0083263 A1 | 3/2009 | Felch et al. | |
| 2009/0175251 A1 | 7/2009 | Litzinger et al. | |
| 2009/0176454 A1 | 7/2009 | Chen et al. | |
| 2011/0010508 A1* | 1/2011 | Miyazaki ............ | G06F 12/0246 |
| | | | 711/E12.001 |
| 2011/0246795 A1 | 10/2011 | Kuo | |
| 2013/0275687 A1 | 10/2013 | Kim | |
| 2014/0254443 A1 | 9/2014 | Chhabra et al. | |
| 2015/0002682 A1 | 1/2015 | Tran | |
| 2015/0103758 A1 | 4/2015 | Wang et al. | |
| 2015/0178091 A1 | 6/2015 | Offen et al. | |
| 2015/0310902 A1 | 10/2015 | Olorode et al. | |
| 2016/0183185 A1 | 6/2016 | Radhakrishnan et al. | |
| 2016/0353382 A1 | 12/2016 | Xue | |
| 2017/0010987 A1* | 1/2017 | Berge .................. | G06F 15/7817 |
| 2017/0070381 A1 | 3/2017 | Chellappan | |
| 2017/0215145 A1 | 7/2017 | Solotke et al. | |
| 2017/0371660 A1 | 12/2017 | Smith et al. | |
| 2019/0004989 A1* | 1/2019 | Chen ...................... | G06F 13/40 |
| 2019/0007794 A1 | 1/2019 | Thakur et al. | |
| 2019/0227971 A1 | 7/2019 | O'Shea et al. | |
| 2019/0254013 A1* | 8/2019 | Chang ...................... | H04L 5/00 |
| 2019/0335538 A1 | 10/2019 | Gopal et al. | |
| 2019/0363745 A1 | 11/2019 | An et al. | |
| 2020/0034186 A1 | 1/2020 | Sanghi et al. | |
| 2020/0104195 A1 | 4/2020 | Sanghi et al. | |
| 2021/0152418 A1* | 5/2021 | Abdelghaffar ....... | H04B 7/0602 |
| 2022/0095142 A1* | 3/2022 | Landis ................ | H04B 17/354 |
| 2023/0129344 A1* | 4/2023 | Mueller .............. | H04B 7/0691 |
| | | | 455/450 |

OTHER PUBLICATIONS

"MIPI SPMI System Power Management Interface," Product Overview from MIPI Alliance, 2008, 5 pages. <URL: https://www.mipi.org/sites/default/files/MIPI_SPM_Interface_Overview_r01.pdf>.

"Serial Peripheral Interface," Wikipedia, [on-line], retrieved from the Internet, [retrieved on May 27, 2020], 10 pages, <URL: https://en.wikipedia.org/wiki/Serial_Peripheral_Interface>.

* cited by examiner

BUS PROTOCOL FOR MULTIPLE CHIPSETS

CROSS REFERENCE TO RELATED APPLICATIONS

This application is a continuation of U.S. non-provisional patent application Ser. No. 17/357,156, filed Jun. 24, 2021, which is a continuation of U.S. non-provisional patent application Ser. No. 16/584,686, filed Sep. 26, 2019, now U.S. Pat. No. 11,074,210, which claims the benefit of U.S. provisional patent application No. 62/777,145, filed Dec. 8, 2018. The disclosures of these applications are incorporated by reference herein in their entireties.

BACKGROUND

Electronic devices are including an ever increasing amount of functionality. This functionality can be provided by chipsets or other circuits for computational processing, graphics processing, wired or wireless communications, sensors, displays, data storage, and other functions.

These chipsets can generate signals that can interfere with other chipsets in an electronic device. For example, chipsets can generate electromagnetic interference (EMI) that can corrupt signals being received, processed, or provided by other chipsets. These chipsets can also generate radio-frequency signals for communications, where the radio-frequency signals can also corrupt the signals of other chipsets. These chipsets can share front-end or radio-frequency components—non-coordinated simultaneous access to these components can lead to performances degradations.

As signals in chipsets are corrupted, the performance of the effected chipsets can be compromised. Data rates can suffer, error rates can increase, and data might need to be resent. Also, power and other resources in the electronic device can be used inefficiently, and other problems can arise. This corruption can be particularly egregious when multiple chipsets attempt to operate at the same time. For example, a computational processing chipset can generate a large amount of EMI at the same time as a wired communication chipset is attempting to receive a low-amplitude data signal. The EMI generated by the computational processing chipset can increase the bit-error rate of the wired communication chipset.

Accordingly, it can be desirable that these chipsets be able to communicate with each other to avoid such a situation. It can also be desirable that the communication be efficient in that is does not consume a great deal of power or require complex input and output circuitry.

Thus, what is needed are circuits, methods, and apparatus that can allow chipsets in an electronic device to efficiently share information such that they can more efficiently utilize resources that are available in the electronic device.

SUMMARY

Accordingly, embodiments of the present invention can provide circuits, methods, and apparatus that can allow chipsets in an electronic device to share messages and information such that they can more efficiently utilize resources that are available in the electronic device. An illustrative embodiment of the present invention can provide a bus that is shared by three or more chipsets in an electronic device. This shared bus can be used by the chipsets in the electronic device to communicate and negotiate for the utilization of resources. This shared bus can convey signals over two, three, four, or more than four wires. Where two wires are used, only two input/output pins are needed by each of the chipsets. This can reduce the number of input/output pins that are needed, particularly when compared to a system that employs a number of point-to-point buses. This can save space and reduce power consumption as well. While embodiments of the present invention are well-suited to sharing messages and information among three or more chipsets in an electronic device, these and other embodiments of the present invention can provide circuits, methods, and apparatus that can allow chipsets in an electronic device to share messages and information between two chipsets.

Multiple chipsets can communicate over this shared bus in order to limit interference and more efficiently share device resources among themselves. For example, the chipsets can use the shared bus to send each other status or state information. But it can be desirable to allow each radio chipset to enter a low-power or sleep state to improve battery utilization and save power. Without more, in a low-power or sleep state, a chipset can miss state updates for the other chipsets in an electronic device. Also, a chipset might not be not able to respond to a status or state inquiry from another chipset if it is in the low-power or sleep state. Accordingly, these and other embodiments of the present invention can provide auto-response buffers for each chipset that is connected to the shared bus. These auto-response buffers can remain powered on an accessible when the chipset is powered down or in a sleep state. This can allow chipsets that are not powered down to receive status or state updates from a power-down chipset.

To achieve this, these and other embodiments of the present invention can provide a first chipset having a first plurality of registers and a second plurality of registers. The first plurality of registers can be always on, that is, they can be auto-response buffers. In this way, while the first chipset is asleep or in a low-power state, the other chipsets on the shared bus can read state information stored in the first plurality of registers in the first chipset using the shared bus. When the first chipset exits the sleep state, the first chipset can read state information from the other chipsets on the shared bus and store the state information in the second plurality of registers in the first chipset.

In these and other embodiments of the present invention, various types of messages and information can be shared by the chipsets using the shared bus. Chipsets can exchange real-time messages such as requests for resources or state updates, for example, when a user initiates a cellular call. Chipsets can also exchange long-term messages such as requests for resources or state updates, for example where an application stored on the electronic device can be updated. There can also be other types of messages and information that can be transferred among the chipsets using the shared bus.

Accordingly, these and other embodiments of the present invention can provide priority handling mechanisms in their connections to the shared bus. For example, two, three, four or more than four levels of priority can be implemented in either or both the transmit and receive paths of a shared bus connection. A higher or highest level of priority can be given to messages such as real-time requests or state updates. A lower or lowest level of priority can be given to messages such as long-term requests or state updates. Other types of requests, updates, commands, or information can be granted one of these levels, or they can be granted another level of priority, for example an intermediate or normal level of priority.

Messages such as requests and updates that are received from the shared bus by a chipset can be stored in one of a number of first-in-first-out memories (FIFOs) or other type of queue in the chipset, where each FIFO or queue stores messages such as requests and updates for one of the levels of priority. These FIFOs can provide messages such as requests and updates to different levels of core circuitry. For example, a chipset can include acceleration hardware coupled to receive high-priority messages such as requests and updates. Similarly, messages such as requests and updates that are to be provided over the shared bus to another chipset can be stored in one of a number of first-in-first-out (FIFO) or other type of queue in the chipset, where each FIFO or queue stores messages such as requests and updates for one of the levels of priority.

In these and other embodiments of the present invention, various resources can be shared by chipsets of an electronic device. The sharing of these resources can be negotiated among the chipsets in the electronic device using messages such as requests and state updates transferred over the shared bus. The shared resources can include the radio-frequency spectrum. For example, two or more chipsets can generate radio-frequency signals that utilize frequency ranges that at least partially overlap. These two or more chipsets can negotiate for time slots during which they can send data. This can help to prevent multiple chipsets from simultaneously sending (or receiving) data at a same or similar frequency. This can be particularly useful where multiple cellular carriers are being employed in a carrier aggregation scheme, or where multiple Wi-Fi bands are be used.

These and other embodiments of the present invention can share circuitry or components of an electronic device, such as a memory, antenna, or display. Two or more chipsets can negotiate for access to a circuit or component, again by transferring messages such as requests and state updates over the shared bus. For example, access to a memory can be negotiated by two or more chipsets. Use of an antenna can similarly be negotiated for. Again, this can be particularly useful where multiple cellular carriers are being employed in a carrier aggregation scheme, or where multiple Wi-Fi bands are be used.

These and other embodiments of the present invention can share power from the battery. That is, peak power from the battery can be a shared resource that is negotiated for using the shared bus. For example, multiple chipsets can simultaneously engage in activities that can use a large amount of power from the battery. This combined power draw can exceed a power output capability of the battery. Without more, this can cause a brownout condition where one or more circuits in the electronic device do not receive a sufficient operating voltage. To prevent this, two or more chipsets can negotiate to draw large amounts of power from the battery or other power source, at different times, again by transferring messages such as requests and state updates over the shared bus.

In these and other embodiments of the present invention, the transmit power can be limited, for example by local, national, or regional regulations. Accordingly, transmit power can be a shared resource that is negotiated for using the shared bus. For example, multiple chipsets can simultaneously attempt to transmit data. As a result, the total transmit power can exceed a regulatory or other type of limit. The chipsets can negotiate over the shared bus to share this resource and can agree to not transmit at the same time.

These and other embodiments of the present invention can provide methods of negotiating for access to shared resources where a priority of an activity can be used in deciding which chipset can access the resource first. Again, a user can initiate a cellular call. This can be a high priority activity and related messages such as requests and state messages on the shared bus can be received and transmitted using the highest priority. Also, since this is a high-priority activity, other chipsets can delay their activities until sufficient resources are available. This granting of priority can be collectively determined by each of the chipsets in the electronic device, by each of the chipsets in the electronic device that are not in a low-power or sleep state, by each of the chipsets that can be in conflict, by the chipset with a higher priority activity, by the chipset with a lower-priority activity, by a chipset tasked with resolving all conflicts, by a chipset tasked with resolving conflicts of the type that has risen, or by another chipset, arbiter, or other circuit, such as a bus controller for the shared bus.

In these and other embodiments of the present invention, various formats can be used in the request, state, and other messages that are transferred among chipsets using the shared bus. For example, these messages can use System Power Management Interface (SPMI) Extended Register Write Long messages, where SPMI is a protocol developed by the Mobile Industry Processor Interface (MIPI) alliance. These messages can have a payload that is 8 bytes, though other sized payloads can be supported as well. The message format can include a header that includes the address space in each receiving chipset that is allocated for messages from the sending chipset. The format can also include information regarding the message type, receiver subsystem, and message fragment and version. In one example, 255 types of messages can be identified using one byte of data. The receiver subsystem can be identified using another byte of data. A third byte of data can be split into three bits for a sequence number, 3 bits for a fragment number, and two bits to identify the version of the message. The sequence number and the fragment number can be used to reconstruct the message. That is, once the headers on the fragments have been removed, the sequence number and fragment number can be used to concatenate the received message fragments to reconstruct the original message. A priority of the message can also be included. Where three or four priorities are defined, two bits can be used to identify the priority. Fewer or additional bits can be used to identify fewer or additional priority states.

In these and other embodiments of the present invention, various messages can be transferred using the shared bus. For example, for backward capability, messages used in one or more legacy formats can be included. For example, messages from Wireless System Interface-2 (WCI-2), developed by Bluetooth Special Interest Group (BT-SIG), can be included in protocols consistent with embodiments of the present invention.

In these and other embodiments of the present invention, a receive activity message can be transmitted and received by chipsets on the shared bus. This message can indicate the presence of receive data activity by a chipset sending the indication. Timestamp indication messages can be used to provide timestamps. Information regarding transmit activity can be provided using a message to indicate transmit activity, a transmit activity envelope indication that can indicate whether receive or transmit activity is occurring and the timing of the envelope, and an indication of the bandwidth used.

In these and other embodiments of the present invention, access to an antenna can be negotiated using an antenna priority request message (to request access to the antenna), an antenna priority accept or response (to indicate that the antenna can be used by the requesting chipset), and an antenna priority indication message (to indicate that the antenna is being used.) State information can be requested with a state request message, where the state request message requests state information (as opposed to a request for access to state information), and this request can be replied to with state information in a state indication message.

In these and other embodiments of the present invention, scan throttle requests can be provided using a scan throttle request message. The link quality configuration can be requested using a link quality configuration message, and a response can be provided using a line quality response. A duration of inactivity can be provided using an inactivity indication message, an Uplink/Downlink (UL/DL) format indication command can be included, while error indication messages can be used to convey the presence of an error.

Embodiments of the present invention can provide circuits, methods, and apparatus that can be located in various types of devices, such as portable computing devices, tablet computers, desktop computers, laptops, all-in-one computers, wearable computing devices, cellular phones, smart phones, media phones, storage devices, portable media players, navigation systems, monitors, power supplies, adapters, remote control devices, chargers, and other devices.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
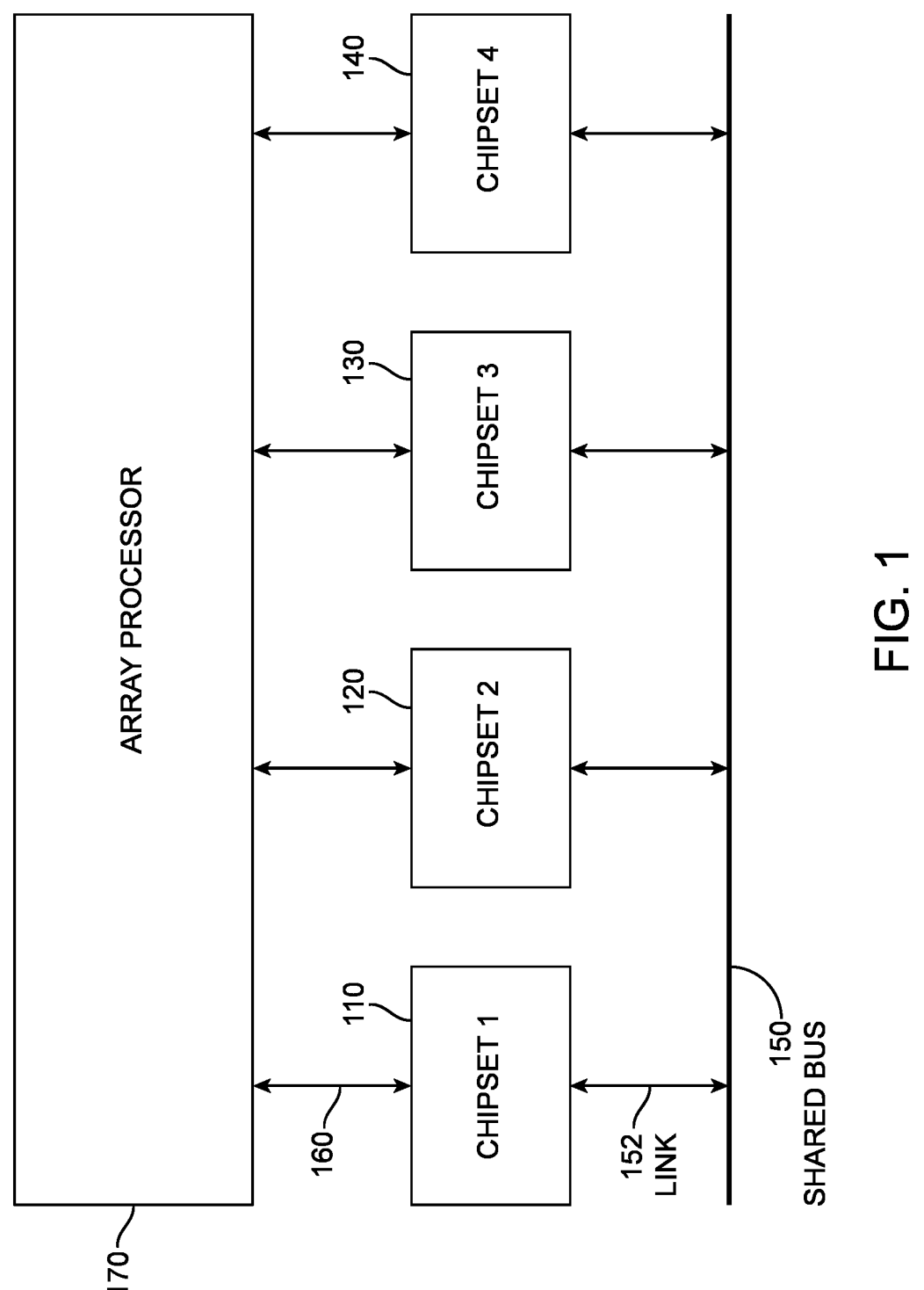
FIG. 1 illustrates a shared bus topology according to an embodiment of the present invention.

FIG. 1 illustrates a portion of an electronic device including a shared bus according to an embodiment of the present invention. This figure, as with the other included figures, is shown for illustrative purposes and does not limit either the possible embodiments of the present invention or the claims.

In this example, shared bus 150 is shared by, or in common with, four chipsets 110, 120, 130, and 140 in an electronic device. Shared bus 150 can be used by the chipsets 110, 120, 130, and 140 in the electronic device to communicate and negotiate for the utilization of resources. Shared bus 150 can convey signals over two, three, four, or more than four wires. Where two wires are used, only two input/output pins are needed by each of the chipsets 110, 120, 130, and 140. This can reduce the number of input/ output pins that are needed, particularly when compared to a bus topology that employs a number of point-to-point buses.

Chipsets 110, 120, 130, and 140 can be chipsets, single integrated circuits, modules, system-on-chips, system-in-package, or other types of circuits. These chipsets or other circuits can be provided for computational processing, graphics processing, wired or wireless communications, such as Bluetooth, Wi-Fi, cellular including 5G, 5G New Radio (NR), Long-Term Evolution (LTE), and LTE Dual Connectivity (DC), stand alone, non-stand alone, ultra wideband (UWB), enhanced Licensed Assisted Access (eLAA), sensors, displays, multi-gigabit wireless, global navigation satellite system, data storage, and other chipsets. While four chipsets are shown in this example, in these and other embodiments of the present invention, three, five, or more than five chipsets can be included. Also, while embodiments of the present invention are well-suited to sharing messages and information among three or more chipsets in an electronic device, these and other embodiments of the present invention can provide circuits, methods, and apparatus that can allow chipsets in an electronic device to share messages and information between two chipsets. Chipsets 110, 120, 130, and 140 can communicate over point-to-point buses 160 with array processor 170. Buses 160 can be a Peripheral Component Interconnect express (PCIe), Serial Peripheral Interface (SPI), or other types of buses.

Multiple chipsets 110, 120, 130, and 140 can communicate over shared bus 150 in order to limit interference, to more efficiently share device resources among themselves, or for other reasons. For example, chipsets 110, 120, 130, and 140 can use shared bus 150 to send each other status or state information. But it can be desirable to allow each chipset 110, 120, 130, and 140 to enter a low-power or sleep state to improve battery utilization and save power. Without more, in a low-power or sleep state, chipset 110 (for example) can miss state updates for the other chipsets 120, 130, and 140. Also, chipset 110 might not be not able to respond to a state inquiry from another chipset 120, 130, and 140 if chipset 110 is in the low-power or sleep state. Accordingly, these and other embodiments of the present invention can provide auto-response (or always on) buffers or registers for each chipset 110, 120, 130, and 140 that is connected to shared bus 150. These auto-response buffers can remain powered on an accessible when a chipset is powered down or in a sleep state. This can allow chipsets that are not powered down to receive status or state updates from a power-down chipset. Examples are shown in the following figure.

Figure 2:
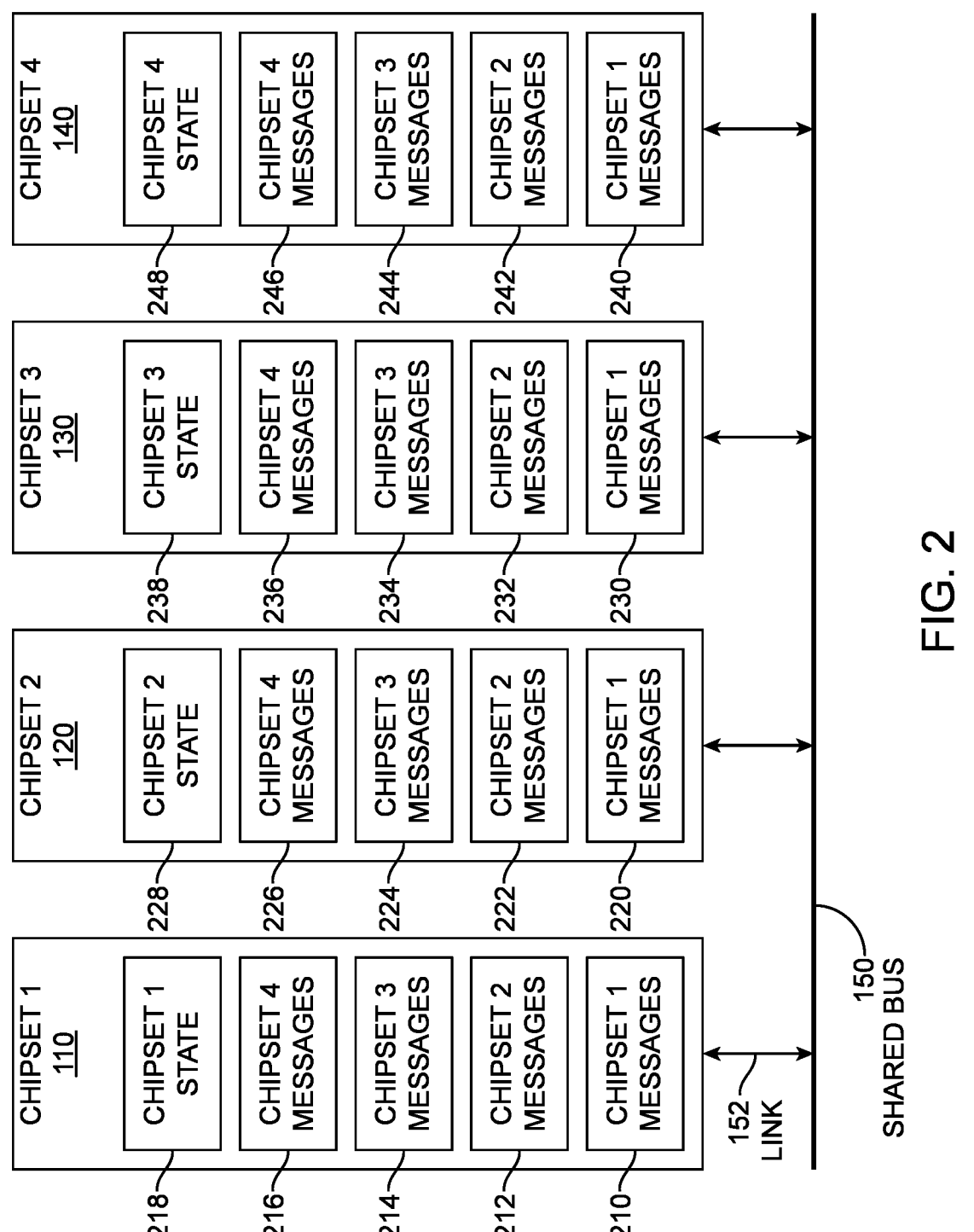
FIG. 2 illustrates registers for chipsets connected to a shared bus in an electronic device according to an embodiment of the present invention.

FIG. 2 illustrates registers for chipsets connected to a shared bus in an electronic device according to an embodiment of the present invention. In this example, a first chipset 110 can have a first plurality of registers 218 and a second plurality of registers 210, 212, 214, and 216, where registers 218 are state registers and registers 210, 212, 214, and 216 are message registers. The first plurality of registers 218 can be always on, that is, they can be auto-response buffers. In this way, while the first chipset 110 is asleep or in a low-power state, the other chipsets 120, 130, and 140 on shared bus 150 can read state information stored in the first plurality of registers 128 in the first chipset 110 using shared bus 150 (or links 152 to shared bus 150.) When the first chipset 110 exits the sleep state, the first chipset 110 can read state information from the other chipsets 120, 130, and 140 on shared bus 150 and store this state information in the second plurality of registers 210, 212, 214, and 216 in the first chipset 110. For example, messages for chipset 1 can be stored in registers 210, messages for chipset 2 can be stored in registers 212, messages for chipset 3 can be stored in registers 214, while messages for chipset 4 can be stored in registers 216. Similarly, for chipset 2 120, messages for chipset 1 can be stored in registers 220, messages for chipset 2 can be stored in registers 222, messages for chipset 3 can be stored in registers 224, while messages for chipset 4 can be stored in registers 226. For chipset 3 130, messages for chipset 1 can be stored in registers 230, messages for chipset 2 can be stored in registers 232, messages for chipset 3 can be stored in registers 234, while messages for chipset 4 can be stored in registers 236. For chipset 4 140, messages for chipset 1 can be stored in registers 240, messages for chipset 2 can be stored in registers 242, messages for chipset 3 can be stored in registers 244, while messages for chipset 4 can be stored in registers 246. Chipset 2 120 can include always on state register 228, chipset 3 130 can include always on state register 238, and chipset 4 140 can include always on state register 248, where state registers 228, 238, and 248 operate in the same or a similar manner as state register 218 in chipset 1 110.

In these and other embodiments of the present invention, various types of information can be shared by the chipsets using the shared bus. For example, chipsets can exchange real-time messages such as requests for resources or state updates, for example where a user initiates a cellular call. Chipsets can also exchange messages such as long-term requests for resources or state updates, for example where an application stored on the electronic device can be updated. There can also be other types of messages and information that can be shared by the chipsets on the shared bus.

Accordingly, these and other embodiments of the present invention can provide priority handling mechanisms in their connections to the shared bus. For example, two, three, four or more than four levels of priority can be implemented in either or both the transmit and receive paths of a shared bus connection. A higher or highest level of priority can be given to messages such as real-time requests or state updates. A lower or lowest level of priority can be given to messages such as long-term requests or state updates. Other types of requests, updates, commands, or information can be granted one of these levels, or they can be granted another level of priority, for example an intermediate or normal level of priority. Circuitry that can track and make use of this message priority is shown in the following figure.

Figure 3:
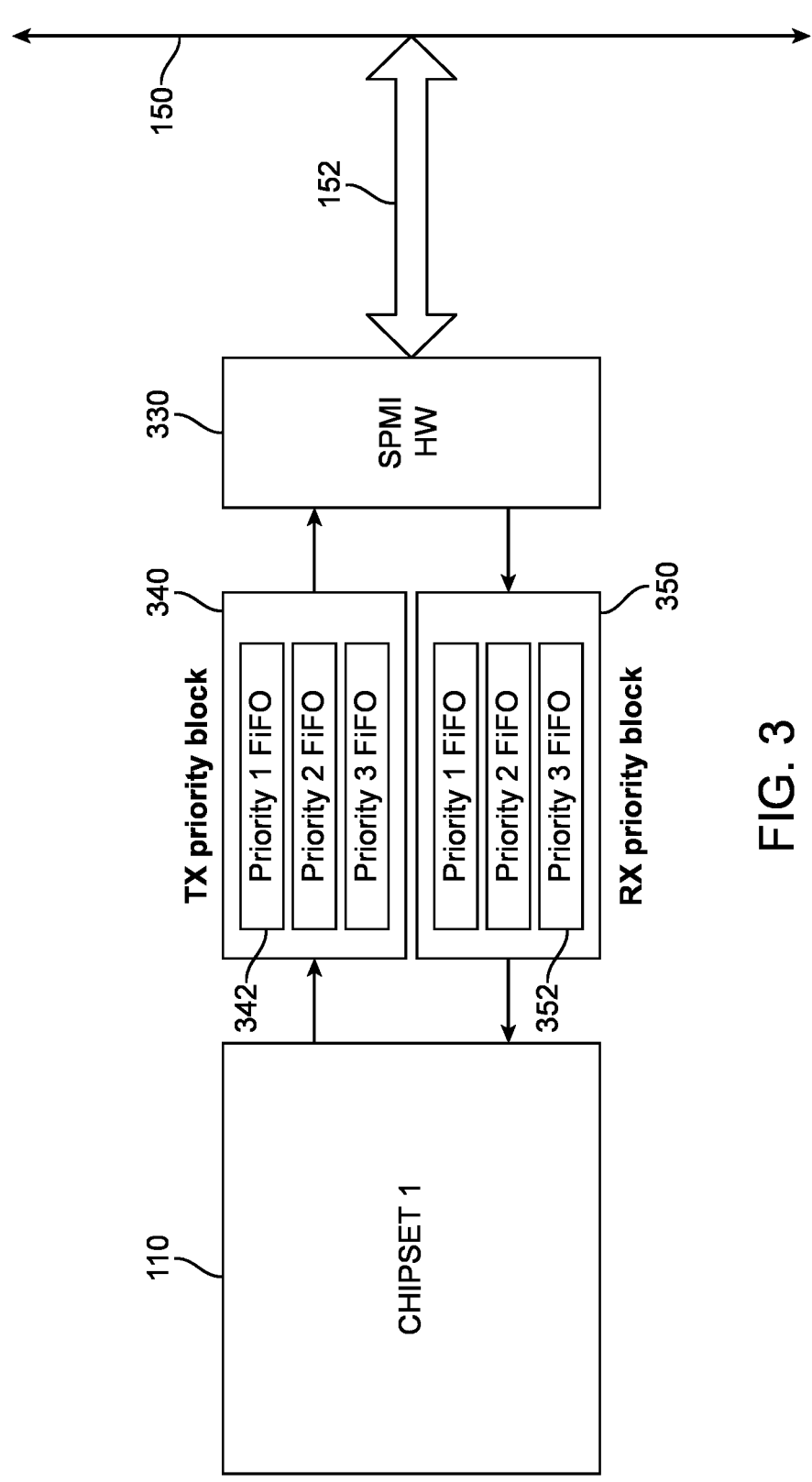
FIG. 3 illustrates input/output circuitry for a chipset coupled to a shared bus in an electronic device according to an embodiment of the present invention.

FIG. 3 illustrates input/output circuitry for a chipset coupled to a shared bus in an electronic device according to an embodiment of the present invention. Messages such as requests and updates that are received from shared bus 150 by chipset 110 (as an example) can be stored in one of a number of FIFOs 352 or other type of queue in receive priority block 350, where each FIFO 352 or queue stores messages such as requests and updates for one of three levels of priority. These FIFOs 352 can provide the messages such as requests and updates to different levels of core circuitry (not shown) in the remaining part of chipset 110. For example, chipset 110 can include acceleration hardware (not shown) coupled to receive high-priority messages such as requests and updates. Similarly, messages such as requests and updates that are to be provided over the shared bus to another chipset can be stored in one of a number of FIFOs 342 or other type of queue in transmit priority block 340, where each FIFO 342 or queue stores messages such as requests and updates for one of three levels of priority. Messages received and transmitted by chipset 110 can be handled by System Power Management Interface (SPMI) hardware 330, or other type of hardware interface, where SPMI is a protocol developed by the Mobile Industry Processor Interface (MIPI) alliance. SPMI hardware 330, transmit priority block 340, and receive priority block 350 are shown separate from chipset 1 110, but can be included as part of chipset 1 110, or as a part of any of the other chipsets 120, 130, and 140. Also, in this example, three priority FIFOs are shown in both transmit priority block 340 and receive priority block 350, though in these and other embodiments of the present invention, transmit priority block 340 and receive priority block 350 can have the same number of FIFOs, they can have a different number of FIFOs, and they can have two, four, or more than four FIFOs, where the number of FIFOs can track the number of priorities implemented.

These and other embodiments of the present invention can provide methods of negotiating for access to shared resources where a priority of an activity can be used in deciding which chipset can access a shared resource first. Again, a user can initiate a cellular call. This can be a high priority activity and messages such as requests and state messages on the shared bus can be received and transmitted using the highest priority. Also, since this is a high-priority activity, other chipsets can delay their activities until sufficient resources are available. This granting of priority can be collectively determined by each of the chipsets in the electronic device, by each of the chipsets in the electronic device that are not in a low-power or sleep state, by each of the chipsets that can be in conflict, by the chipset with a higher priority activity, by the chipset with a lower-priority activity, by a chipset tasked with resolving all conflicts, by a chipset tasked with resolving conflicts of the type that has risen, or by another chipset, arbiter, or other circuit, such as a bus controller for the shared bus.

In these and other embodiments of the present invention, various formats can be used in the request, state, and other messages that are transferred among chipsets using the shared bus. For example, these messages can use SPMI Extended Register Write Long messages. These messages can have a payload that is 8 bytes, though other lengths of payloads can be supported as well. The message format can include a header that includes the address space in each receiving chipset that is allocated for messages from the sending chipset. The format can also include information regarding the message type, receiver subsystem, and message fragment and version. In one example, 255 types of messages can be identified using one byte of data. The receiver subsystem can be identified using another byte of data. A third byte of data can be split into three bits for a sequence number, 3 bits for a fragment number, and two bits to identify the version of the message. The sequence number and the fragment number can be used to reconstruct the message. That is, the sequence number and fragment number can be used to concatenate received message fragments, once their headers have been removed, to reconstruct the original message. A priority of the message can also be included. Where three or four priorities are defined, two bits can be used to identify the priority. Fewer or additional bits can be used to identify fewer or additional priority states. An example of one reconstruction technique is shown in the following figure.

Figure 4:
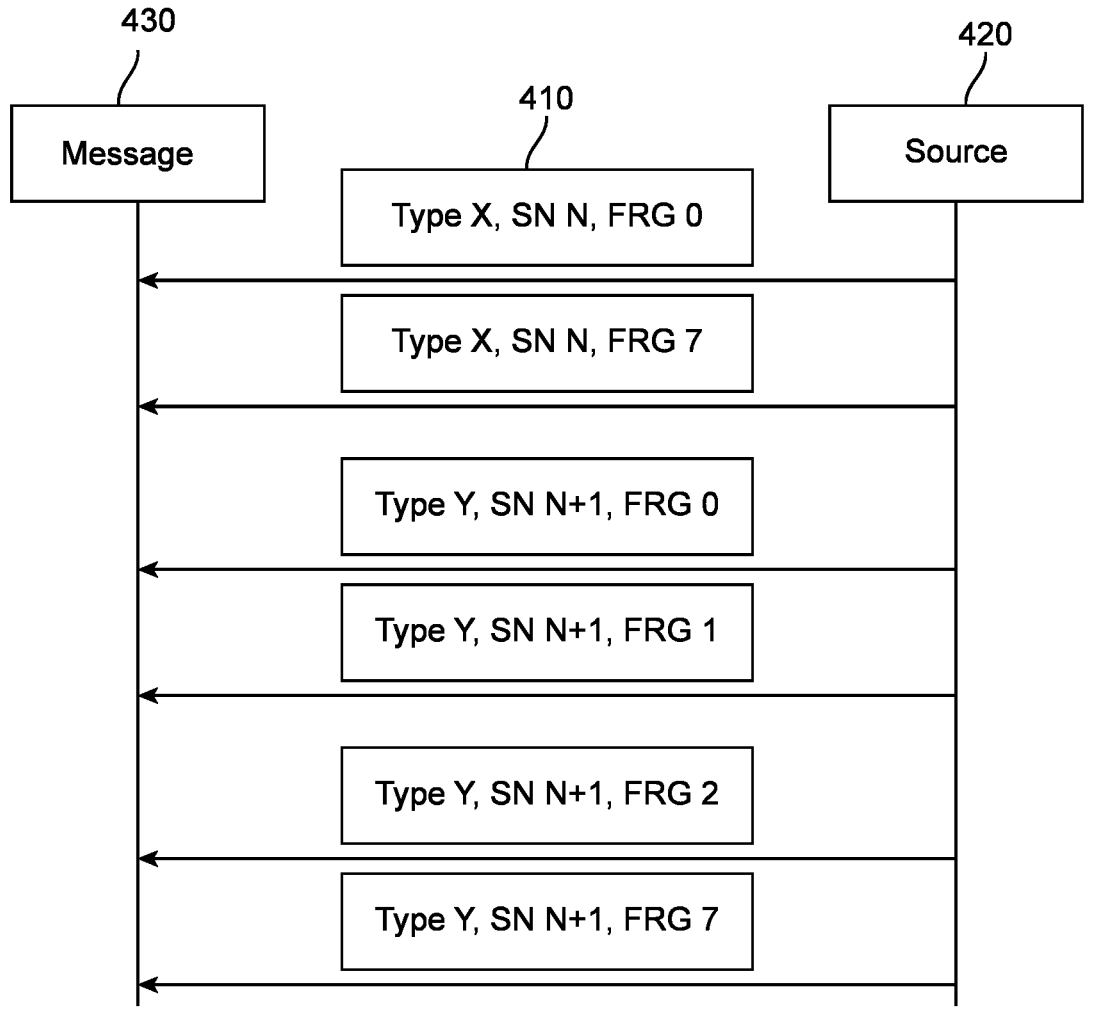
FIG. 4 illustrates a method of concatenating message fragments according to an embodiment of the present invention.

FIG. 4 illustrates a method of concatenating message fragments according to an embodiment of the present invention. In this example, message fragments 410 from a source 420 can be sorted by type (X or Y in this example), by segment (N or N+1 in this example) and fragment (fragments FRG 0, FRG1, FRG2, or FRG7 in this example) where fragment FRG 7 is used to indicate a final fragment of a message. Once ordered, the fragments can be concatenated to reconstruct the transmitted messages 430.

In these and other embodiments of the present invention, various resources can be shared by chipsets of an electronic device. The sharing of these resources can be negotiated among the chipsets in the electronic device using messages such as requests and state updates transferred over the shared bus. The resources can include the radio-frequency spectrum. For example, two or more chipsets can generate radio-frequency signals that utilize frequency ranges that at least partially overlap. These two or more chipsets can negotiate for time slots during which they can send data. This can prevent multiple chipsets from simultaneously sending (or receiving) data at a same or similar frequency. This can be particularly useful where multiple cellular carriers are being employed in a carrier aggregation scheme, or where multiple Wi-Fi bands are be used.

These and other embodiments of the present invention can share circuitry or components of the electronic device, such as a memory, antenna, or display. Two or more chipsets can negotiate for access to a circuit or component, again by transferring messages such as requests and state updates over the shared bus. For example, access to a memory can be negotiated by two or more chipsets. Use of an antenna can similarly be negotiated for. Again, this can be particularly useful where multiple cellular carriers are being employed in a carrier aggregation scheme, or where multiple Wi-Fi bands are be used.

These and other embodiments of the present invention can share power from the battery. That is, peak power from the battery can be a shared resource that is negotiated for using the shared bus. For example, multiple chipsets can simultaneously engage in activities that can use a large amount of power from the battery. This combined power draw can exceed a power output capability of the battery. Without more, this can cause a brownout condition where one or more circuits in the electronic device do not receive a sufficient operating voltage. To prevent this, two or more chipsets can negotiate to draw large amounts of power from the battery or other power source at different (non-simultaneous) times, again by transferring messages such as requests and state updates over the shared bus.

In these and other embodiments of the present invention, the transmit power can be limited, for example by local, national, or regional regulations. Accordingly, transmit power can be a shared resource that is negotiated for using the shared bus. For example, multiple chipsets can simultaneously attempt to transmit data. As a result, the total transmit power can exceed a regulatory or other type of limit. The chipsets can negotiate over the shared bus to share this resource and can agree to not transmit at the same time.

Again, frequency spectrum can be a shared resource and access to that resource can be negotiated for using messages provided over the shared bus 150. Accordingly, embodiments of the present invention can provide methods of generating a list of frequencies where conflicts can occur among chipsets. An example is shown in the following figure.

Figure 5:
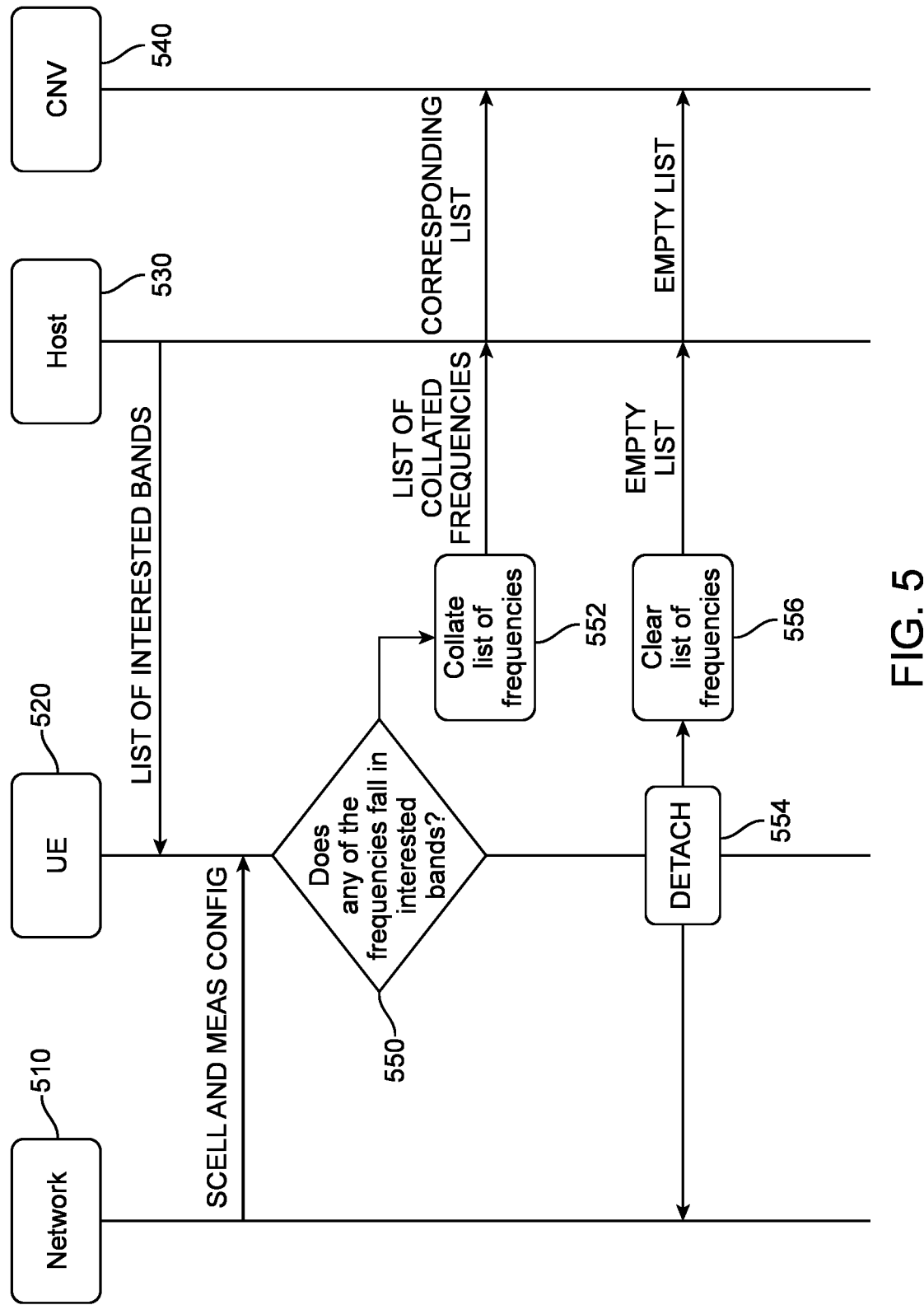
FIG. 5 illustrates a method of generating a list of frequencies where conflicts can occur among chipsets.

FIG. 5 illustrates a method of generating a list of frequencies where conflicts can occur among chipsets. In this example, host 530 can send baseband 520 a list of bands that can be used by the cellular modem. In act 550, the baseband then compares this list with a list of bands that it uses. It can also do a match with bands provided by network 510. A list of frequencies where conflicts can occur is generated in act 552 and provided to host 530. Host 530 can pass this information along to connectivity circuit 540, where connectivity circuit 540 is a combined Bluetooth/Wi-Fi circuit. Following a detach in act 554, these lists can be cleared in act 556.

In these and other embodiments of the present invention, various messages can be transferred using the shared bus. For example, for backward capability, messages used in one or more legacy formats can be included. For example, messages from Wireless System Interface-2 (WCI-2), developed by Bluetooth Special Interest Group (BT-SIG), can be included in protocols consistent with embodiments of the present invention.

In these and other embodiments of the present invention, a receive activity message can be transmitted and received by chipsets on the shared bus. This message can indicate the presence of receive data activity by a chipset sending the indication. Timestamp indication messages can be used to provide timestamps. An example of how these timestamps can be generated is shown in the following figure.

Figure 6:
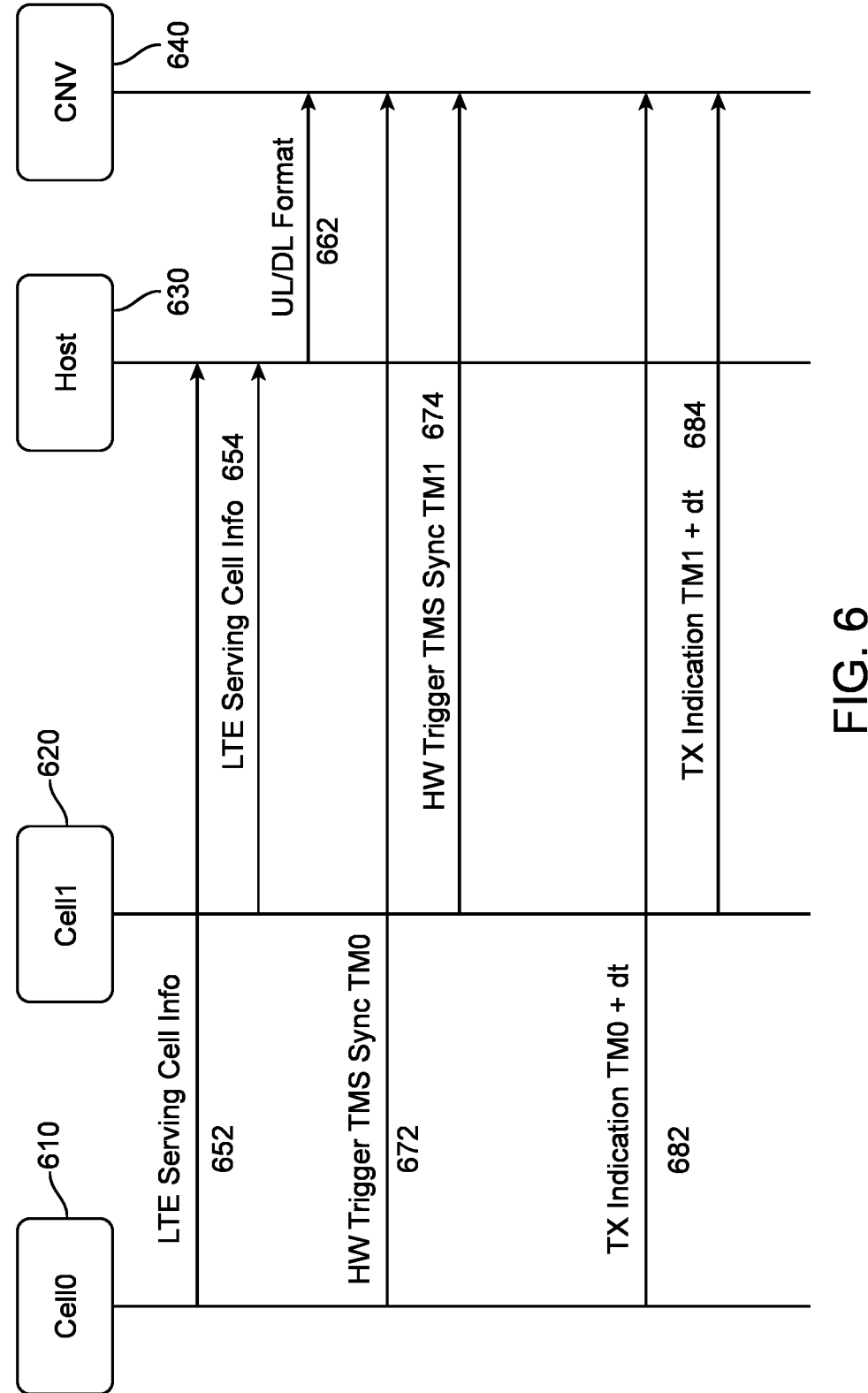
FIG. 6 illustrates a sequence for an indication of a timestamp according to an embodiment of the present invention.

FIG. 6 illustrates a sequence for an indication of a timestamp according to an embodiment of the present invention. In this example, call information messages 652 and 654 from two cellular chipsets 610 and 620 can provide cell information to host 630. Host 630 can provide uplink/downlink information 662 to connectivity circuit 640. Timing triggers 672 and 674 can be provided by the cellular chipsets 610 and 620 to connectivity circuit 640. Indications of transmission 682 and 684 can then be sent from cellular chipsets 610 and 620 to connectivity circuit 640.

Other messages can be transferred using the shared bus. For example, information regarding transmit activity can be provided using a message to indicate transmit activity, a transmit activity envelope indication that can indicate whether receive or transmit activity is occurring and the timing of the envelope, and an indication of the bandwidth used.

In these and other embodiments of the present invention, access to an antenna can be negotiated using an antenna priority request message (to request access to the antenna), an antenna priority accept or response (to indicate that the antenna can be used by the requesting chipset), and an antenna priority indication message (to indicate that the antenna is being used.) Status or state information can be requested with a state request message, where the state request message requests state information (as opposed to a request for access to state information), and this request can be replied to with state information in a state indication message.

In these and other embodiments of the present invention, scan throttle requests can be provided using a scan throttle request message. Link quality configuration can be requested using a link quality configuration message, and a response can be provided using a line quality response. A duration of inactivity can be provided using an inactivity indication message, a UI/DL format indication command can be included, while error indication messages can be used to convey the presence of an error.

Embodiments of the present invention can provide circuits, methods, and apparatus that can be located in various types of devices, such as portable computing devices, tablet computers, desktop computers, laptops, all-in-one computers, wearable computing devices, cellular phones, smart phones, media phones, storage devices, portable media players, navigation systems, monitors, power supplies, adapters, remote control devices, chargers, and other devices.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:
a first chipset that utilizes a first frequency range;
a second chipset that utilizes a second frequency range at least partially overlapping the first frequency range; and
an inter-chipset bus communicatively coupled to the first chipset and the second chipset, and configured to transfer, between the first chipset and the second chipset, one or more messages that negotiate for use of the first frequency range and the second frequency range.

2. The electronic device of claim 1 further comprising:
a third chipset, wherein
the inter-chipset bus is coupled to the third chipset, and
the inter-chipset bus is configured to convey one or more messages between the first chipset and the third chipset and one or more messages between the second chipset and the third chipset that negotiate for use of one or more shared resources.

3. The electronic device of claim 1, wherein the one or more messages contain priority information.

4. The electronic device of claim 1, wherein
the first chipset is configured to generate radio-frequency signals that utilize the first frequency range, and
the second chipset is configured to generate radio-frequency signals that utilize the second frequency range.

5. The electronic device of claim 1, wherein, based on the one or more messages, the first chipset is configured to send radio-frequency signals that utilize the first frequency range in a first time slot and the second chipset is configured to send radio-frequency signals that utilize the second frequency range in a second time slot.

6. The electronic device of claim 1, wherein
the first chipset is configured to receive radio-frequency signals that utilize the first frequency range, and
the second chipset is configured to receive radio-frequency signals that utilize the second frequency range.

7. The electronic device of claim 1, wherein, based on the one or more messages, the first chipset is configured to receive radio-frequency signals that utilize the first frequency range in a first time slot and the second chipset is configured to receive radio-frequency signals that utilize the second frequency range in a second time slot.

8. The electronic device of claim 1 further comprising:
an antenna coupled to the first chipset and the second chipset, wherein the inter-chipset bus is configured to transfer one or more additional messages between the first chipset and the second chipset that negotiate for use of the antenna.

9. The electronic device of claim 1 further comprising:
a memory coupled to the first chipset and the second chipset, wherein the inter-chipset bus is configured to transfer one or more additional messages between the first chipset and the second chipset that negotiate for use of the memory.

10. The electronic device of claim 1 further comprising:
a battery coupled to the first chipset and the second chipset, wherein the inter-chipset bus is configured to transfer one or more additional messages between the first chipset and the second chipset that negotiate for use of the battery.

11. The electronic device of claim 10, wherein, based on the one or more additional messages, the first chipset and the second chipset are configured to draw power exceeding a threshold from the battery at different times.

12. The electronic device of claim 1, wherein the inter-chipset bus is configured to transfer one or more additional messages between the first chipset and the second chipset that negotiate for use of transmit power.

13. An electronic device comprising:
a chipset for wireless communication that includes an auto-response buffer configured to store state information of the chipset and to be powered on when the chipset is powered down or in a sleep state; and
an inter-chipset bus communicatively coupled to the chipset, wherein the state information is accessible from the auto-response buffer via the inter-chipset bus when the chipset is powered down or in the sleep state.

14. The electronic device of claim 13 further comprising:
an additional chipset coupled to the inter-chipset bus and configured to obtain the state information of the chipset from the auto-response buffer when the chipset is powered down or in the sleep state.

15. The electronic device of claim 13, wherein the chipset includes a storage circuit configured to store messages from one or more other chipsets received via the inter-chipset bus.

16. An electronic device comprising:
a first chipset for wireless communication;
a second chipset for wireless communication;
a third chipset; and
a shared bus communicatively coupled to the first chipset, the second chipset, and the third chipset, and configured to transfer, between the first chipset and the second chipset, one or more messages that include an indication of transmit or receive activity at the first chipset and an indication of a used bandwidth and that negotiate for use of one or more resources shared between the first chipset and the second chipset.

17. The electronic device of claim 16, wherein
the first chipset has a first storage circuit that stores messages received from the second chipset via the shared bus, and
the first chipset has a second storage circuit that stores messages received from the third chipset via the shared bus.

18. The electronic device of claim 16, wherein
the first chipset has a storage circuit that stores state information for the first chipset, and
the second chipset and the third chipset are each configured to obtain the state information via the shared bus.

19. The electronic device of claim 16, wherein
the first chipset has first and second input-output pins coupled to the shared bus,
the second chipset has first and second input-output pins coupled to the shared bus, and
the third chipset has first and second input-output pins coupled to the shared bus.

20. The electronic device of claim 16, wherein the one or more messages between the first chipset and the second chipset include a timing of an activity envelope.

* * * * *